Dec. 23, 1958  W. N. PARKE  2,865,236
PNEUMATIC DRILL
Filed June 11, 1956
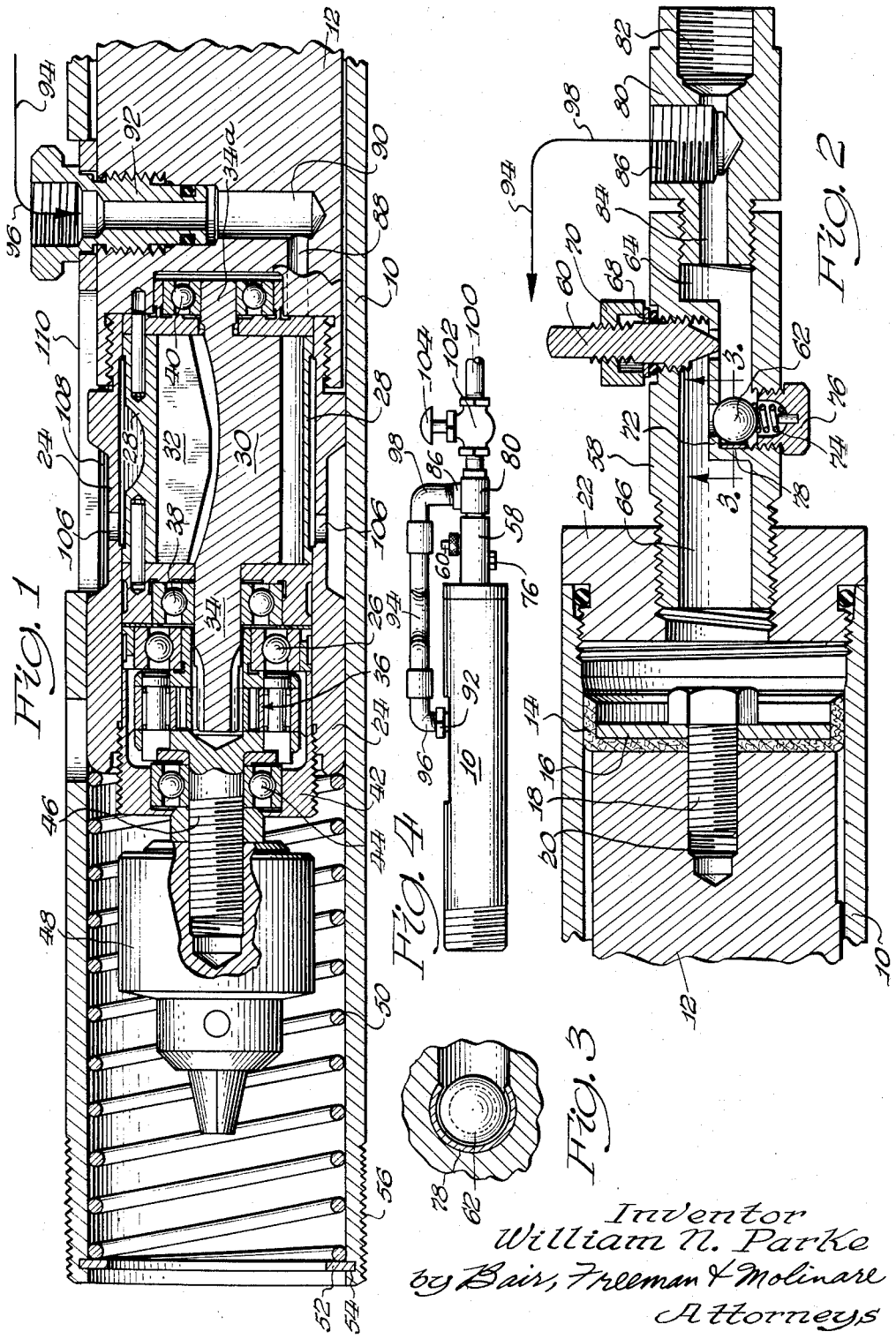
Inventor
William N. Parke
by Bair, Freeman & Molinare
Attorneys United States Patent Office
2,865,236
Patented Dec. 23, 1958

2,865,236

PNEUMATIC DRILL

William N. Parke, Pittsburgh, Pa., assignor to The ARO Equipment Corporation, Bryan, Ohio, a corporation of Ohio Application June 11, 1956, Serial No. 590,518

3 Claims. (Cl. 77—33.5)

This invention relates to a fluid operated tool such as a pneumatic drill which has a drill chuck driven by a pneumatic motor, and feed means for the drill bit with respect to the work is also fluid operated.

One object of the invention is to provide a simple spring-returned drill capable of economic production, and a head on the drill to which valve components are attached and are capable of (1) operation to secure controlled rate of advance of the drill bit in response to opening of a control valve for supplying air to the drill and its pneumatic feed means, and (2) rapid retraction of the drill bit in response to closing of the control valve to cut off the supply of such air.

Another object is to provide a pneumatic drill which is adapted for operation as described and in which a needle valve in the drill head may be adjusted for controlling the rate of feed of the drill bit.

A further object is to provide the inclusion of a check valve in the line to the pneumatic feed of the drill in such manner that the air cannot pass through the check valve during the feeding of the drill bit but instead is controlled by the needle valve which shunts the check valve for controlling the rate of advance, yet when the drilling operation is completed and the control valve is closed, fast return of the drill is had by reason of the quick passage of return air (under the action of the return spring) from the feed cylinder through the check valve whereupon it exhausts through the motor thus rotating the motor several revolutions during the withdrawal of the drill.

With these and other objects in view, my invention consists in the construction, arrangement and combination of the various parts of my pneumatic drill, whereby the objects above contemplated are attained, as hereinafter more fully set forth, pointed out in my claims and illustrated in detail on the accompanying drawing, wherein:

Fig. 1 is an axial vertical sectional view through the front half of a pneumatic drill embodying my invention, the drill chuck being shown partially in elevation;

Fig. 2 is a similar sectional view of the rear half thereof;

Fig. 3 is an enlarged sectional view on the line 3—3 of Fig. 2 showing details of a check valve; and Fig. 4 is a complete side elevation of the drill on a reduced scale showing pneumatic connections and the connection of the drill to a control valve and supply line.

On the accompanying drawing I have used the reference numeral 10 to indicate a tubular housing which provides a feed cylinder for the drill. Slidably mounted in the housing 10 is a drill carrying block 12 having on its right-hand end as shown in Fig. 2 a piston 14 of cupped construction retained by a washer 16 and a cap screw 18 threaded into an opening 20 of the block 12. The piston 14 constitutes a pneumatic feed piston in the feed cylinder 10 for the block 12 and the drill bit carried thereby as will hereinafter appear. The right-hand end of the cylinder 10 is enclosed by a head 22.

A tubular motor casing 24 is screw-threadedly connected with the left-hand end of the block 12 as shown in Fig. 1 and is slidable along the interior surface of the housing or cylinder 10. Within the motor casing 24 is a stator 28 and a rotor 30 of a pneumatic motor of the vane type, one of the vanes being shown at 32. A motor shaft 34 extends from the rotor 30.

Planetary gearing 36 connects the motor shaft 34 with a chuck shaft 46 rotated at reduced speed relative to the motor shaft 34 by the planetary gearing 36. A drill chuck 48 is mounted on the chuck shaft 46 for operation by the pneumatic motor 28—30—32.

An extension casing 42 threads into the motor casing 24 and supports the gearing 36 and a bearing 44 for the chuck shaft 46. The motor casing also supports a bearing 26 for the planetary gearing 36, and the stator 28 supports bearings 38 and 40 for the motor shaft 34 and an extension 34a thereof respectively. Within the left-hand or forward end of the housing 10, I provide a return spring 50 held in position by a snap ring 52 in a groove 54 of the housing 10. The housing may be threaded as at 56 for connection with a suitable drill jig or other means of support for the drill.

Screwed into the head 22 is a valve housing 58 having therein a needle valve 60 and a check valve of ball type, the ball being shown at 62. The valve housing 58 has an inlet 64 and an outlet 66, the valves 60 and 62 being interposed between the two as clearly shown in Fig. 2 and being in shunting relation to each other.

The needle valve 60 is adjustable, being threaded in the valve housing 58 for this purpose, and is sealed by an O-ring 68 and a cap 70. The check ball 62 is normally seated on a seat 72 by a spring 74 contained in a cap 76. A C-shaped strip of metal 78 is provided for guiding the ball 62 as shown in Fig. 3 and for preventing its entry into the inlet 64. A T fitting 80 is connected with the inlet 64 and has an inlet 82, an outlet 84 to the inlet 64 and a side outlet 86.

Referring to Fig. 1, the motor 28—30—32 is provided with an inlet port 88 connected with a cross port 90 into which an inlet fitting 92 is screwed. As shown in Fig. 4, this fitting 92 is connected with the side outlet 86 of the T 80 by a flexible hose 94 and a pair of elbows 96 and 98. A compressed air supply pipe 100 is also shown in this figure together with a control valve 102 of the normally closed type which may be opened for the drilling and drill feeding operation by depression of a knob 104 thereof. The elbows 96 and 98 and the hose 94 are shown diagrammatically in Figs. 1 and 2. The hose is of greater length than the normal distance between the elbows, such as S-shape in plan view, to permit the drill motor to advance in the cylinder 10 during the drilling operation.

*Practical operation*

My drill is energized by depressing the knob 104 of the control valve 102 which admits to the T fitting 80, part of which goes to the motor and part of which goes to the pneumatic feed. The first part referred to passes out of the side outlet 86 of the fitting 80 and through the hose 94 to the motor inlet 88. This causes rotation of the motor and consequently the chuck 48, the exhaust from the motor being controlled in the usual manner by porting, and exhaust passageways 106 and 108 through the wall and around the outside of the motor casing 24 as shown in Fig. 1, finally discharging through a slot 110 in the housing 10. The second part of the air passes through the outlet 84 into the valve body 58 and is controlled in its flow to the feed piston 14 by the setting of the needle valve 60. It cannot pass through the check valve 62 which closes in the feed direction.

At the end of the drilling operation the valve 102 may be released which will shut off the air supply and permit the feed air in the cylinder 10 back of the piston 14 thereing to be displaced by expansion of the spring 50 back through the valve body 58 and the hose 94 to the motor from which it is discharged through the exhaust slot 110. Since there is no longer full air pressure on the motor, it will slow down but it will rotate the drill bit a few revolutions by reason of the feed air returning through the hose 94 as just described. During this operation the check valve 62 opens so as to permit relatively fast return of the drill bit for retraction from the work as distinguished from relatively slow and controlled advance thereof as adjusted by the needle valve 60.

From the foregoing description it will be obvious that I have provided a relatively simple pneumatic drill which will accomplish the objects contemplated and which may be conveniently controlled either manually or automatically as desired. Obviously, in place of the manual valve 102, an automatically timed valve or the like could be provided where the drilling operations are such as to permit of such an arrangement.

Some changes may be made in the construction and arrangement of the parts of my pneumatic drill without departing from the real spirit and purpose of my invention, and it is my intention to cover by my claims any modified forms of structure or use of mechanical equivalents which may reasonably be included within their scape.

I claim as my invention:

1. In a pneumatic drill of the character disclosed, a pneumatic motor, pneumatic feed means therefor, spring return means for said feed means, and means for controlling said motor and said feed means comprising a control valve for admitting air to said motor and said feed means in one position and for cutting off air to both in another position, a needle valve for controlling the rate of air to said feed means only, and a normally closed check valve shunting said needle valve and opening in the return direction from said feed means whereby said feed means is controlled by said needle valve and check valve independent of the air admitted to said motor under control of said control valve only.

2. A pneumatic drill comprising a pneumatic motor, pneumatic feed means therefor, spring return means for said feed means, and means for controlling said motor and said feed means comprising a main valve for admitting air in parallel to said motor and said feed means in one position and cutting off air to both in another position, a rate-of-flow valve between said control valve and said feed means only, and a normally closed check valve shunting said rate-of-flow valve and opening in the return direction from said feed means to said motor whereby said rate-of-flow valve and said check valve affect the operation of said feed means without affecting the operation of said motor.

3. In a fluid operated drill, a fluid operated motor, fluid operated feed means therefor, spring return means for said feed means, and means for controlling said feed means comprising a control valve for admitting fluid thereto and to said motor, a rate-of-flow valve for controlling the fluid to said feed means only, a normally closed one-way valve for permitting rapid discharge of fluid from said feed means, said one-way valve closing when fluid is fed to the feed means through said rate-of-flow valve so that the speed of the feed means is under control of said rate-of-flow valve only while the motor is receiving full air from said control valve, and a connection from said feed means through said one-way valve and said rate-of-flow valve in shunting relation to each other with the one-way valve open and to the motor, and exhausting therethrough, on the return movement of said feed means resulting from closure of said control valve and by reason of expansion of said spring return means.

References Cited in the file of this patent

UNITED STATES PATENTS

| | | |
|---|---|---|
| 2,395,018 | Sherman | Feb. 19, 1946 |
| 2,652,732 | Frye | Sept. 22, 1953 |
| 2,657,595 | Shaff | Nov. 3, 1953 |